(12) United States Patent
Arman

(10) Patent No.: US 6,453,677 B1
(45) Date of Patent: Sep. 24, 2002

(54) MAGNETIC REFRIGERATION CRYOGENIC VESSEL SYSTEM

(75) Inventor: Bayram Arman, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/115,968

(22) Filed: Apr. 5, 2002

(51) Int. Cl.[7] ............................................. F25B 21/00
(52) U.S. Cl. ................................... 62/3.1; 62/47.1
(58) Field of Search .................................. 62/3.1, 47.1

(56) References Cited

U.S. PATENT DOCUMENTS

| | | | |
|---|---|---|---|
| 3,133,422 A | 5/1964 | Paivanas et al. | 62/50 |
| 4,718,239 A | 1/1988 | Nowobilski et al. | 62/55 |
| 4,727,723 A | 3/1988 | Durr | 62/54 |
| 5,463,868 A | * 11/1995 | Peschka et al. | 62/3.1 |
| 5,571,231 A | 11/1996 | Lee | 62/48.2 |
| 5,586,437 A | * 12/1996 | Blecher et al. | 62/47.1 |
| 5,699,839 A | 12/1997 | Dehne | 141/248 |
| 5,966,944 A | 10/1999 | Inoue et al. | 62/51.1 |
| 6,205,812 B1 | 3/2001 | Acharya et al. | 62/607 |
| 6,293,106 B1 | 9/2001 | Acharya et al. | 62/3.1 |
| 6,336,331 B1 | 1/2002 | White et al. | 62/48.2 |

* cited by examiner

Primary Examiner—Ronald Capossela
(74) Attorney, Agent, or Firm—Stanley Ktorides

(57) ABSTRACT

A cryogenic vessel system for containing cryogenic fluid wherein refrigeration is generated by applying and withdrawing a magnetic field to a bed of magnetizable particles, and the refrigeration is provided to the vessel interior to counteract heat leak into the vessel.

13 Claims, 3 Drawing Sheets

MAGNETIC REFRIGERATION CRYOGENIC VESSEL SYSTEM

TECHNICAL FIELD

This invention relates generally to the containment of cryogenic fluids such as for storage or other purposes.

BACKGROUND ART

The storage or other containment of a cryogenic fluid involves the use of insulated vessels to reduce as much as possible the loss of some of the cryogenic fluid due to heat leak into the vessel. However, even with the use of the best insulation systems available, a significant portion of the contained cryogen will vaporize due to the heat leak, resulting in a pressure increase within the container to the point at which the vapor is vented to the atmosphere through safety valves. This loss of cryogenic fluid imposes a significant economic burden, especially for higher cost cryogenic fluids such as helium and neon which are used for such applications as superconductivity.

Accordingly it is an object of this invention to provide a system for storing or otherwise containing a cryogenic fluid which can reduce or eliminate losses due to heat leak into the fluid.

SUMMARY OF THE INVENTION

The above and other objects, which will become apparent to those skilled in the art upon a reading of this disclosure, are attained by the present invention, one aspect of which is:

A method for providing refrigeration to a cryogenic vessel comprising:
(A) passing working fluid through a bed of magnetic particles and passing heat from the bed of magnetic particles to the working fluid to produce warmed working fluid and a cooled bed of magnetic particles;
(B) removing heat from the warmed working fluid to produce cooled working fluid;
(C) passing cooled working fluid through the cooled bed of magnetic particles to produce refrigeration bearing working fluid; and
(D) providing refrigeration from the refrigeration bearing working fluid to a cryogenic vessel which contains cryogenic fluid.

Another aspect of the invention is:

A cryogenic vessel comprising:
(A) a vessel having an outer shell defining a vessel interior;
(B) a first reservoir, a cold heat exchanger, a magnetic particle bed, said first reservoir being in flow communication with said cold heat exchanger, and said cold heat exchanger being in flow communication with said magnetic particle bed;
(C) a hot heat exchanger, a second reservoir, said magnetic particle bed being in flow communication with said hot heat exchanger, and said hot heat exchanger being in flow communication with said second reservoir; and
(D) said cold heat exchanger being in heat exchange relation with the vessel interior.

DETAILED DESCRIPTION

The invention relates to vessels for containing cryogenic fluids such as stationary storage tanks, mobile tankage, dewars and the like. Among the cryogenic fluids which can be effectively contained with the use of this invention one can name hydrogen, helium, neon, oxygen, nitrogen, argon, carbon dioxide, krypton, xenon, carbon monoxide, methane and mixtures such as air and natural gas.

Figure 1:
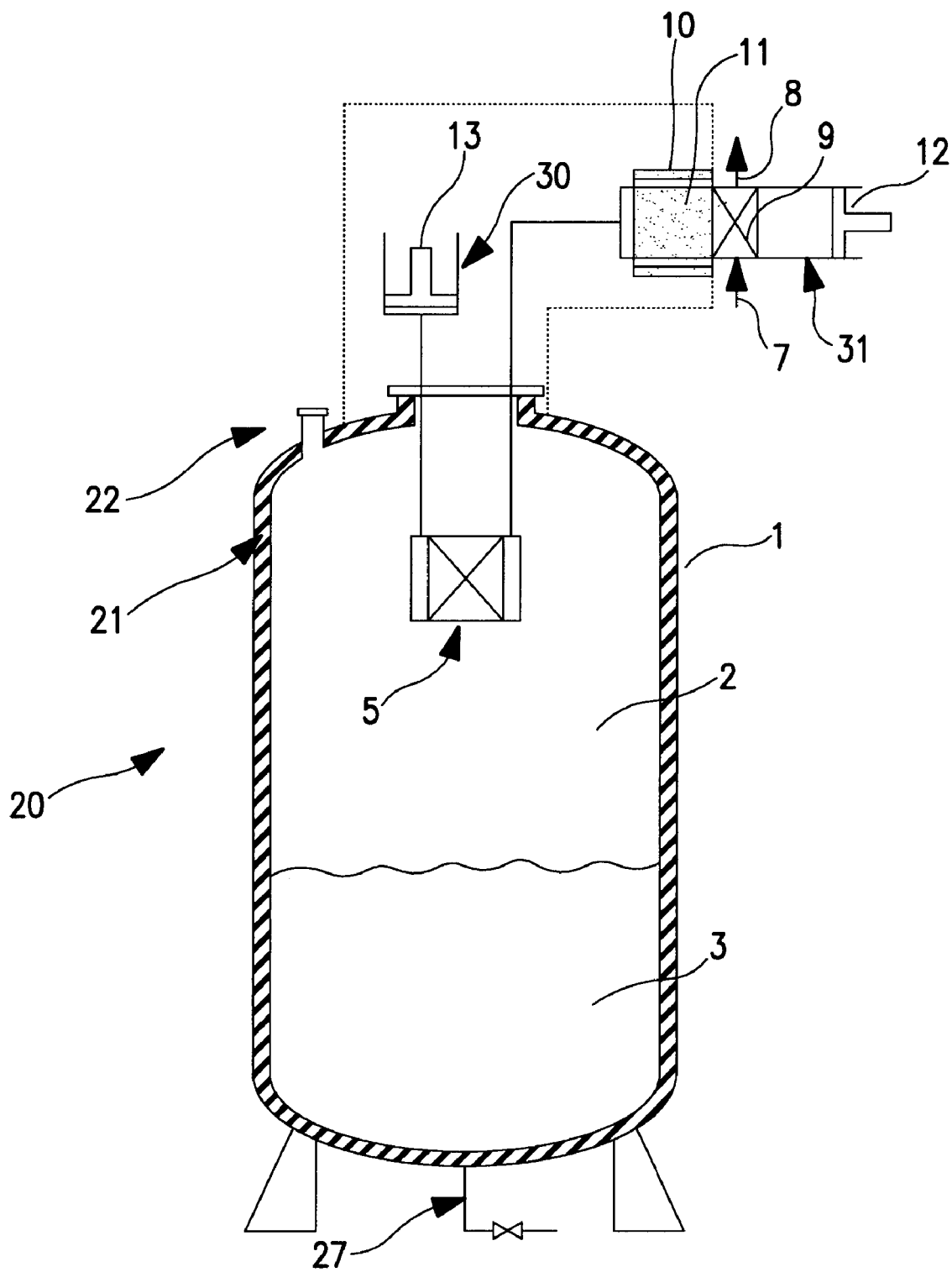
FIG. 1 is a cross-sectional representation of one preferred embodiment of the cryogenic vessel system of this invention.

The invention will be discussed in greater detail with reference to the Drawings. Referring now to FIG. 1, cryogenic vessel 20 has an outer shell 1, which defines a vessel interior 2. The vessel interior 2 contains insulation 21 which, in the embodiment of the invention illustrated in FIG. 1, is a layer of insulation abutting the inner surface of vessel shell 1. Vessel interior 2 also contains a quantity of cryogenic liquid 3. Absent the magnetic refrigeration provision of this invention, ambient heat leak into the vessel through the insulation will cause some of the cryogenic liquid to vaporize and ultimately some of the vaporized cryogenic fluid will be vented through safety valve 22.

In the operation of a magnetic refrigeration system, the temperature of a bed of magnetocaloric particles, hereafter referred to as magnetic particles, is changed with an applied magnetic field. Working fluid is used as the heat transfer fluid to move heat or refrigeration generated by the magnetic particles to the working fluid. The preferred working fluid is helium gas. Other gases which may be used as the working fluid in the practice of the invention include air, nitrogen, oxygen, argon and neon.

One embodiment of a magnetic refrigeration system useful in the practice of this invention is shown in FIG. 1. The system shown in FIG. 1 employs pistons and cylinders to move the working fluid through the system. First piston 13 operates within first reservoir or cylinder 30 and second piston 12 operates within second reservoir or cylinder 31. Bed 11 comprises magnetic particles.

Magnetic bed 11 can be composed of a number of different magnetic materials, gadolinium nickel ($GdNi_2$), a ferromagnet, is one example. Other magnetic materials which may be employed in the practice of this invention include, $GdZn_2$, $GdTiO_3$, $Gd_2Ni_{17}$, $GdAl_2$, $GdMg$, $GdCd$, $Gd_4CO_3$, $GdGa$, $Gd_5Si_4$ and $GdZn$.

Table 1 lists magnetic materials that are suitable for magnetocaloric service over a range of temperatures. A graded or layered bed of these materials could be used to reach a given temperature level.

TABLE 1

| Temperature Level | Magnetic Material |
| --- | --- |
| 260–315K | $Gd_5(Si_{0.5}GeO.5)_4$ |
| 230–280K | $Gd_5(Si_{0.43}Ge_{0.57})_4$ |
| 130–185K | $Gd_5(Si_{0.25}Ge_{0.75})_4$ |
| 60–90K | $Gd_5(Si_{0.825}Ge_{0.9175})_4$ |
| 10–50K | $Gd_5Ge_4$ |

At the beginning of the magnetic refrigeration cycle, cold heat exchanger 5 is initially at a low temperature, e.g. 40 K, and hot heat exchanger 9 is warmer, e.g. at about 80 K. Magnet 10 is ready to be moved into position surrounding magnetic bed 11. Working fluid, e.g. helium gas, in cylinder 30 is displaced by piston 13 through the connecting system. By moving the strong magnet 10 to be around bed 11, the magnetic field surrounding magnetic regenerator bed 11 is increased. The magnetocaloric effect causes each magnetic particle in magnetic regenerator bed 11 to warm up. The enclosed helium gas flows from the first cylinder 30, through cold heat exchanger 5, magnetic regenerator bed 11 and hot heat exchanger 9 to fill cylinder 31. The particles in bed 11 are cooled by the flowing working gas and the working gas in turn is warmed by the bed arriving at a temperature near to the temperature of bed 11 at the warm end. Heat is transferred 7,8 from the working fluid to a heat sink such as liquid nitrogen as the gas flows through hot heat exchanger 9. The helium gas leaving bed 11 at the hot end will be at a higher temperature, e.g. 75 K.

When the second piston 12 reaches its extreme open position, the working gas flow is stopped, and the magnetic field is removed by repositioning magnet 10 to the left and demagnetizing the bed particles and cooling bed 11. The last step of the cycle is the travel of pistons 12 and 13 to their other positions. This causes the helium gas to flow from cylinder 31, through hot heat exchanger 9, magnetic regenerator bed 11, cold heat exchanger 5, and into cylinder volume 30. The helium is refrigerated as it flows through cooled bed 11 leaving at a refrigerated temperature, e.g. below 40 K.

The further cooled or refrigeration bearing working fluid is warmed by passage through cold heat exchanger 5 on its way to first reservoir or cylinder 30 thereby providing refrigeration by indirect heat exchange from the refrigeration bearing working fluid to the cryogenic vessel. The cryogenic fluid may be withdrawn from the cryogenic vessel through passage 27.

The cold heat exchanger is in heat exchange relation with the vessel interior. Preferably the cold heat exchanger is at least in part within the vessel interior. In FIG. 1 the cold heat exchanger is shown as being within the vessel interior 2 in the volume occupied by vapor. The cold heat exchanger could also be positioned so that it delivers at least some refrigeration directly to liquid within the vessel interior. In another embodiment the cold heat exchanger could be connected to a heat pipe or other heat transfer device which passes the refrigeration to the cryogenic vapor and/or cryogenic liquid within the vessel interior. In yet another embodiment, the cold heat exchanger could be positioned to deliver refrigeration directly to the insulation within the vessel interior. In yet another embodiment the cold heat exchanger could be positioned outside of vessel 1 and vapor from the vessel interior could be drawn into the cold heat exchanger and condensed, and thereafter passed back into the interior of the vessel.

Figure 2:
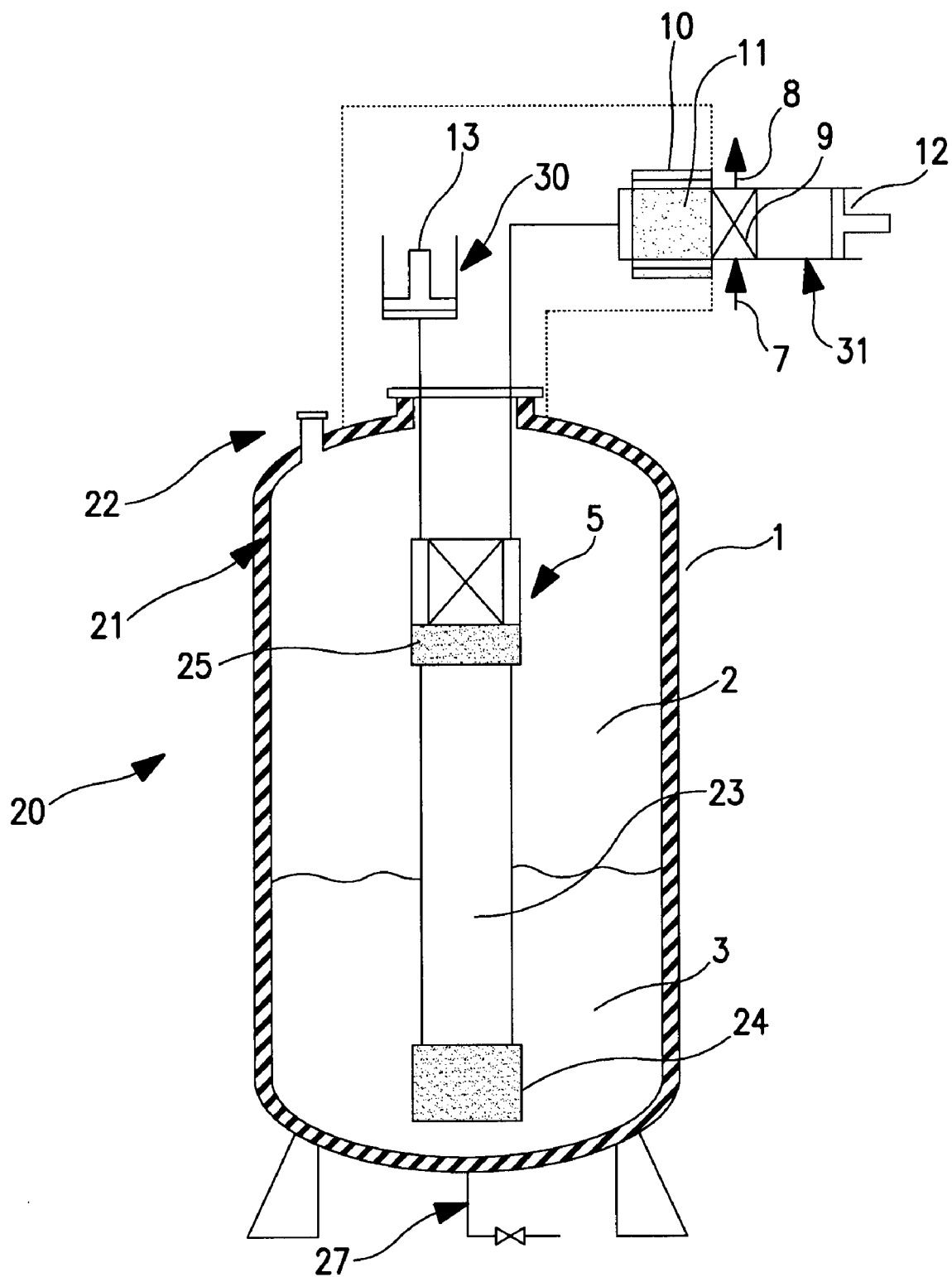
FIG. 2 is a cross-sectional representation of another preferred embodiment of the cryogenic vessel system of this invention wherein a heat pipe is employed.

FIG. 2 illustrates another embodiment of the invention wherein a heat pipe is used to deliver refrigeration from the cold heat exchanger to cryogenic liquid within the vessel interior. The numerals in FIG. 2 are the same as those of FIG. 1 for the common elements, and these common elements will not be described again in detail.

A heat pipe is a thermal device for efficiently transferring heat from one end of the pipe to its other end. Typically the device comprises of a low conducting (e.g. stainless steel) pipe closed at both ends, containing a heat transfer fluid, gas or gas mixture at an appropriate pressure at ambient temperature, so as to change phase, namely condense at the end in contact with the cold heat exchanger of the pulse tube, and boil at the other end, which is in contact with the cryogenic fluid to be condensed or subcooled. For instance, to condense vapor or subcool liquid in the vessel interior 2, for example at 80 K, the mass of nitrogen gas in the heat pipe could be determined by the vapor and liquid portions designed for the heat pipe volume corresponding to the phase change condition of nitrogen at 80 K.

Figure 3:
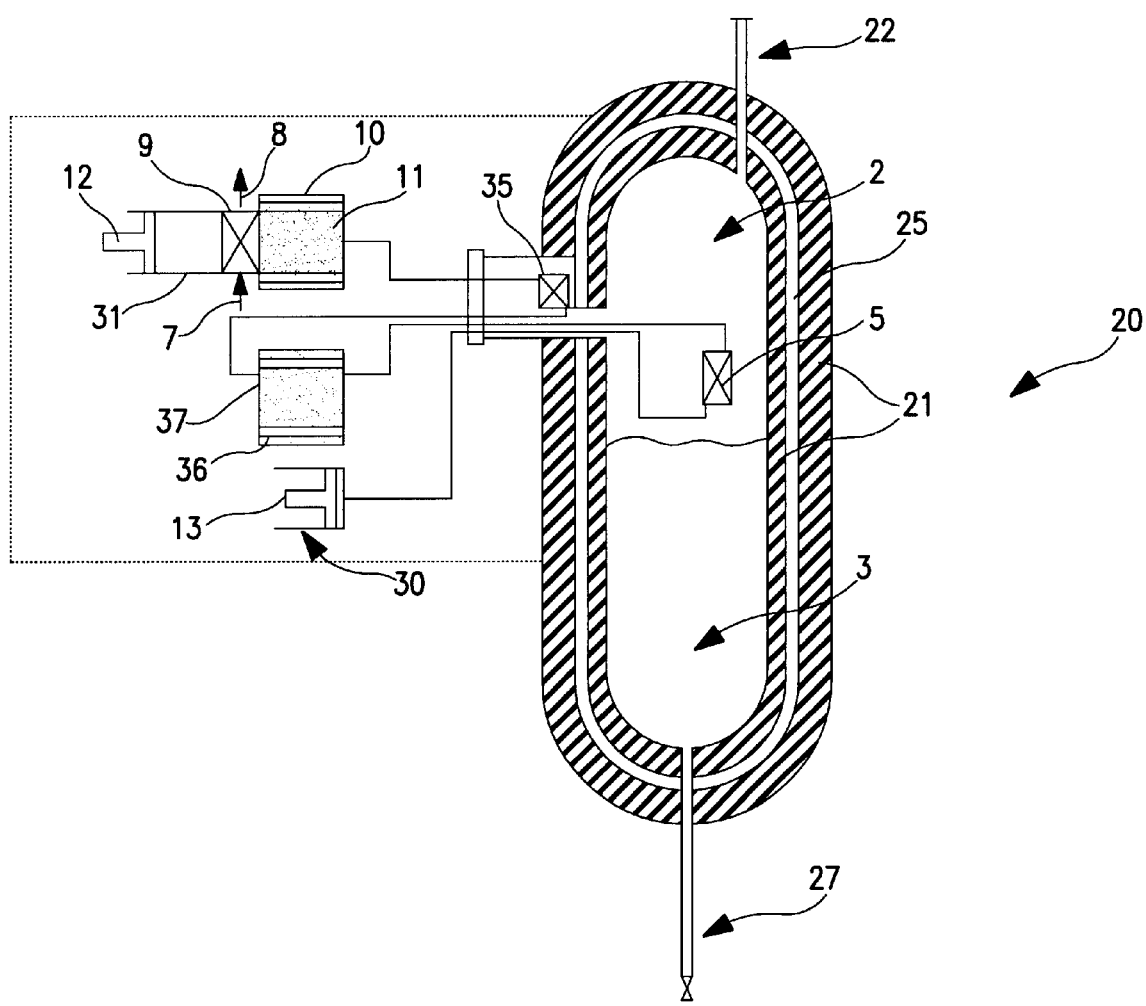
FIG. 3 is a cross-sectional representation of another preferred embodiment of the cryogenic vessel system of this invention wherein refrigeration is provided directly to the insulation within the vessel interior.

FIG. 3 illustrates another embodiment of the invention wherein refrigeration is provided to two places within the vessel interior, one of those places being a thermoshield within the insulation. The numerals in FIG. 3 are the same as those of FIG. 1 for the common elements, and these common elements will not be described again in detail.

Referring now to FIG. 3 cryogenic vessel 20 has a thermoshield 25 within insulation 21 in the vessel interior. The thermoshield could be metallic material, or it could be lower value cryogenic fluid, e.g. liquid nitrogen, or any other entity which serves to intercept heat leak into the vessel.

The embodiment illustrated in FIG. 3 employs a second cold heat exchanger 35 and a second magnetic bed 37 with an associated second magnet 36. The second magnetic bed and magnet operate in the same manner as do magnetic bed 11 and magnet 10. Refrigeration bearing working fluid passing from magnetic bed 11 is passed to second cold heat exchanger 35 wherein it provides refrigeration to thermoshield 25 within the interior of cryogenic vessel 20. The working fluid then passes to second magnetic bed 37 wherein it picks up further refrigeration and then passes to cold heat exchanger 5 wherein it provides further refrigeration to the cryogenic vessel 20 before passing to first reservoir 30. The passage of the working fluid from first reservoir or cylinder 30 to second reservoir or cylinder 31 is the same as was described with reference to FIG. 1 except that the working fluid traverses second bed 37 and second cold heat exchanger 35 as it passes from cold heat exchanger 5 to magnetic bed 10.

Although the invention has been described in detail with reference to certain preferred embodiments, those skilled in the art will recognize that there are other embodiments of the invention, e.g. two independent magnetic refrigerators, within the spirit and the scope of the claims. For example, the cold portion of the magnetic refrigeration system which is outside the cryogenic vessel could be enclosed in an insulated structure, such as is shown by the dotted lines in FIG. 1. FIG. 3 illustrates an embodiment wherein the entire magnetic refrigeration system which is outside the cryogenic vessel is enclosed in an insulated structure depicted by the dotted lines.

What is claimed is:

1. A method for providing refrigeration to a cryogenic vessel comprising:
   (A) passing working fluid through a bed of magnetic particles and passing heat from the bed of magnetic particles to the working fluid to produce warmed working fluid and a cooled bed of magnetic particles;
   (B) removing heat from the warmed working fluid to produce cooled working fluid;
   (C) passing cooled working fluid through the cooled bed of magnetic particles to produce refrigeration bearing working fluid; and
   (D) providing refrigeration from the refrigeration bearing working fluid to a cryogenic vessel which contains cryogenic fluid.

2. The method of claim 1 wherein the refrigeration is provided directly to the cryogenic fluid.

3. The method of claim 1 wherein the cryogenic vessel contains insulation with a thermoshield and the refrigeration is provided directly to the insulation.

4. The method of claim 3 wherein refrigeration is also provided directly to the cryogenic fluid.

5. The method of claim 1 wherein the working fluid comprises helium.

6. The method of claim 1 wherein refrigeration is provided to a heat pipe fluid which then provides the refrigeration to the cryogenic fluid.

7. A cryogenic vessel comprising:

(A) a vessel having an outer shell defining a vessel interior;

(B) a first reservoir, a cold heat exchanger, a magnetic particle bed, said first reservoir being in flow communication with said cold heat exchanger, and said cold heat exchanger being in flow communication with said magnetic particle bed;

(C) a hot heat exchanger, a second reservoir, said magnetic particle bed being in flow communication with said hot heat exchanger, and said hot heat exchanger being in flow communication with said second reservoir; and (D) said cold heat exchanger being in heat exchange relation with the vessel interior.

8. The cryogenic vessel of claim 7 wherein the vessel interior contains insulation with a thermoshield.

9. The cryogenic vessel of claim 7 comprising a second cold heat exchanger and a second magnetic particle bed wherein the second magnetic particle bed is in flow communication with the cold heat exchanger, and the second cold heat exchanger is in flow communication with the magnetic particle bed.

10. The cryogenic vessel of claim 9 wherein the vessel interior contains insulation with a thermoshield and the second cold heat exchanger provides refrigeration to the thermoshield.

11. The cryogenic vessel of claim 7 wherein at least one of the first reservoir and the second reservoir is a cylinder for a piston.

12. The cryogenic vessel of claim 7 further comprising a heat pipe in heat exchange relation with the cold heat exchanger.

13. The cryogenic vessel of claim 7 wherein the cold heat exchanger is at least in part within the vessel interior.

* * * * *